United States Patent
Reinholdt et al.

(10) Patent No.: US 10,359,123 B2
(45) Date of Patent: Jul. 23, 2019

(54) FLUID PRESSURE REGULATOR WITH REVERSE FLOW CAPABILITY

(71) Applicant: Eaton Corporation, Cleveland, OH (US)

(72) Inventors: James W. Reinholdt, San Clemente, CA (US); Arthur Gryszkiewicz, Anaheim, CA (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 15/634,279

(22) Filed: Jun. 27, 2017

(65) Prior Publication Data

US 2017/0370488 A1    Dec. 28, 2017

Related U.S. Application Data

(60) Provisional application No. 62/355,423, filed on Jun. 28, 2016.

(51) Int. Cl.
*F16K 1/12* (2006.01)
*F16K 17/04* (2006.01)
*G05D 16/10* (2006.01)

(52) U.S. Cl.
CPC ......... *F16K 17/048* (2013.01); *G05D 16/103* (2013.01); *G05D 16/106* (2013.01); *Y10T 137/3421* (2015.04); *Y10T 137/7777* (2015.04)

(58) Field of Classification Search
CPC ......... Y10T 137/3421; Y10T 137/7772; Y10T 137/7777; Y10T 137/7779; Y10T 137/7794
See application file for complete search history.

(56) References Cited

U.S. PATENT DOCUMENTS

| | | | | |
|---|---|---|---|---|
| 2,630,178 A | * | 3/1953 | Brown | E21B 21/10 137/493 |
| 2,873,758 A | * | 2/1959 | Nielsen | F04B 53/10 137/209 |
| 3,359,998 A | * | 12/1967 | Fike | F16K 1/126 137/220 |
| 3,586,033 A | * | 6/1971 | Hieber | B64D 39/06 137/220 |
| 3,603,343 A | * | 9/1971 | Keller | F16K 17/196 137/493.6 |
| 3,976,100 A | * | 8/1976 | Souslin | B64D 39/06 137/599.01 |
| 4,008,733 A | * | 2/1977 | Courant | B64F 1/28 137/220 |

(Continued)

OTHER PUBLICATIONS

"Disposed" definition. Printed Feb. 2018.*

*Primary Examiner* — Robert K Arundale
(74) *Attorney, Agent, or Firm* — Fishman Stewart PLLC (57) ABSTRACT

A fluid pressure regulator includes a housing having an inlet and an outlet, a valve assembly disposed in the housing, and one or more check valves disposed within the housing. The one or more check valves may be closed when a regulator inlet pressure is greater than a regulator output pressure. When the regulator output pressure is greater than the regulator input pressure, the one or more check valves may open and flow may occur from the outlet of the fluid regulator to the inlet of the fluid regulator, even if the valve assembly is in a closed position.

19 Claims, 6 Drawing Sheets

(56) References Cited

U.S. PATENT DOCUMENTS

| | | | | |
|---|---|---|---|---|
| 5,582,202 | A | * | 12/1996 | Schultz ................ F16K 17/196 |
| | | | | 137/493.3 |
| 6,006,781 | A | * | 12/1999 | Brandt .................. F02M 37/22 |
| | | | | 137/493.6 |
| 6,026,848 | A | * | 2/2000 | Huynh ................ F16K 17/196 |
| | | | | 137/493.1 |
| 2005/0028869 | A1 | * | 2/2005 | Roth .................... F16K 17/196 |
| | | | | 137/493.4 |
| 2009/0126805 | A1 | * | 5/2009 | Olshanetsky ...... F02M 25/0872 |
| | | | | 137/511 |
| 2010/0243061 | A1 | * | 9/2010 | Mouskis ............. G05D 16/106 |
| | | | | 137/1 |
| 2015/0284106 | A1 | * | 10/2015 | Reinholdt .............. B64D 39/04 |
| | | | | 244/135 A |
| 2016/0096631 | A1 | * | 4/2016 | Reinholdt .............. B64D 39/06 |
| | | | | 137/613 |

* cited by examiner

FLUID PRESSURE REGULATOR WITH REVERSE FLOW CAPABILITY

CROSS-REFERENCE TO RELATED APPLICATION

This application claims the benefit of U.S. Provisional Patent Application Ser. No. 62/355,423, filed on Jun. 28, 2016, the disclosure of which is hereby incorporated herein by reference in its entirety.

TECHNICAL FIELD

The present disclosure relates generally to fluid pressure regulators, including fuel pressure regulators, systems and methods with reverse flow capability.

BACKGROUND

Some boom-refueling-equipped aerial refueling tanker aircraft employ fuel pressure regulators to control downstream fuel pressure to, inter alia, help prevent over-pressurization of a receiver aircraft fuel system during aerial refueling. However, such regulators do not allow reverse flow when downstream pressure exceeds the regulated outlet pressure. Such a condition can sometimes create issues, such as high axial loads in the boom, which in turn can damage the boom and/or the receiver aircraft receptacle, and high pressures inside the tanker aircraft's fuel manifolds, which can cause them to deform, or even rupture or burst. Such a condition can occur during retraction of a telescoping section of a boom or during refueling when a receiver aircraft advances a telescoping section of the boom into the fixed position.

Among other things, it can be challenging to provide fluid pressure regulators, systems, and methods that address conventional challenges.

BRIEF DESCRIPTION OF THE DRAWINGS

The present disclosure will now be described, by way of example, with reference to the included drawings, below, in which.

DETAILED DESCRIPTION

Reference will now be made in detail to embodiments of the present disclosure, examples of which are described herein and illustrated in the accompanying drawings. While the disclosed concepts will be described in conjunction with embodiments, it will be understood that they are not intended to limit the disclosure to these embodiments. On the contrary, the disclosure is intended to cover alternatives, modifications, and equivalents.

An embodiment of a fluid pressure regulator 10 according to aspects and teachings of the present disclosure is generally illustrated in FIGS. 1, 1A, 2, 2A, 3, and 3A. As generally illustrated, a fluid regulator 10 may include a housing 20, an inlet 22, an outlet 24, a valve assembly 30, and/or one or more check valves (e.g., check valves 50, 50'). For example only, and without limitation, fluid pressure regulator 10 may include a 5-inch fuel pressure regulator. However, the disclosure is not so limited and may include a number of other fluid pressure regulators and/or fluid control systems. Housing 20 may include a longitudinal axis 20A. Housing 20 may include a fluid chamber 26 that may provide and/or be part of one or more fluid paths for fluid 12 to flow between inlet 22 and outlet 24. For example and without limitation, housing 20 may include a first fluid flow path 60 (e.g., a forward flow path) and a second fluid path 62 (e.g., a reverse flow path).

With embodiments, valve assembly 30 may be configured for controlling the flow of fluid 12 between inlet 22 and outlet 24. Valve assembly 30 may include a valve body 32 and/or a piston 40. Valve body 32 may include one or more of a variety of shapes, sizes, and/or configurations. For example and without limitation, valve body 32 may include a generally ovoid-like or prolate spheroid-like shape (e.g., may be generally football-shaped) with a first end 34 disposed proximate housing inlet 22 and a second end 36 disposed proximate housing outlet 24. A piston 40 may be configured to move relative to valve body 32 (e.g., axially) between a first/open position (see, e.g., FIGS. 1 and 1A) and a second/closed position (see, e.g., FIGS. 2, 2A, 3, and 3A). Piston 40 may be configured to selectively provide a fluid seal between housing 20 and valve body 32 to control fluid flow between inlet 22 and outlet 24. Piston 40 may include one or more of a variety of shapes, sizes, configurations, and/or materials. For example and without limitation, piston 40 may include a cylindrical portion 42 that may include a cylindrical outer wall 44 and one or more apertures 46 (e.g., axially-extending apertures) through which fluid 12 may flow. Outer wall 44 may engage with housing 20 and/or valve body 32 (e.g., with a valve seat 38 of valve body 32) to provide a fluid seal between housing 20 and valve body 32. In an open position, outer wall 44 may engage an inner surface 28 of housing 20 and may not be engaged with valve body 32, which may allow fluid 12 may flow between inlet 22 and outlet 24 (e.g., from inlet 22 to outlet 24). For example and without limitation, an open position of piston 40 may include piston 40 being extended toward outlet 24 such that outer wall 44 is not in contact with a valve seat 38 of valve body 32. In an open position of piston 40, fluid 12 may, for example, flow through the first fluid flow path 60, which may include flowing from inlet 22, around valve body 32, and through piston 40 to outlet 24. In a closed position, piston 40 may restrict and/or prevent fluid flow between inlet 22 and outlet 24 in at least one direction (e.g., from inlet 22 to outlet 24 and/or from outlet 24 to inlet 22). For example and without limitation, in a closed position, outer wall 44 may be engaged with inner surface 28 of housing 20 and with valve seat 38 of valve body 32, which may restrict and/or prevent fluid flow via the first fluid flow path 60.

With embodiments, one or more valve springs 80 may be connected with piston 40 and/or may control movement of piston 40 according to fluid pressures at inlet 22 and/or outlet 24. For example and without limitation, if a fluid pressure at or about outlet 24 is within an outlet pressure range and a fluid pressure at or about inlet 22 is within an inlet pressure range, springs 80 may cause piston 40 to move to or remain in an open position. If a fluid pressure at or about outlet 24 is not within an outlet pressure range and/or a fluid pressure at or about inlet 22 is not within an inlet pressure range, springs 80 may cause piston 40 to move to or remain in a closed position. Springs 80 may be concentric.

In some circumstances, a fluid pressure at or about outlet 24 may not be within an outlet pressure range (e.g., outlet fluid pressure may be above an outlet pressure range) and valve springs 80 may cause piston 40 to move to or remain in a closed position, which may prevent fluid 12 from flowing from outlet 24 to inlet 22 via the first fluid flow path 60 and/or prevent a pressure reduction at outlet 24. However, if outlet fluid pressure is sufficiently high, it may be desirable to allow fluid 12 to flow from outlet 24 to inlet 22. For example and without limitation, allowing fluid flow from outlet 24 to inlet 22 may reduce the outlet fluid pressure, which may help prevent damage to components connected to outlet 24 (e.g., fluid tanks, fluid manifolds, fuel booms, etc.).

With embodiments, fluid regulator 10 may be configured to selectively allow fluid 12 to flow from outlet 24 to inlet 22, such as via one or more check valves (e.g., check valves 50, 50') that may be disposed in housing 20. A check valve 50, 50' may be disposed at least partially in valve body 32 and may allow fluid 12 to flow from outlet 24 to inlet 22 (e.g., via second flow path 62) if an outlet fluid pressure is above a threshold value. For example and without limitation, a check valve 50, 50' may include a spring 52, 52' that may bias the check valve 50, 50' to a closed position and/or may provide a biasing force that corresponds to a threshold outlet fluid pressure. A check valve 50, 50' may be connected to and/or integrated with valve body 32. For example and without limitation, a check valve 50, 50' may be disposed at least partially in a fluid passage 90, 90' (e.g., an internal fluid passage) of valve body 32 and/or may control fluid flow through fluid passage 90, 90'.

Figure 1:
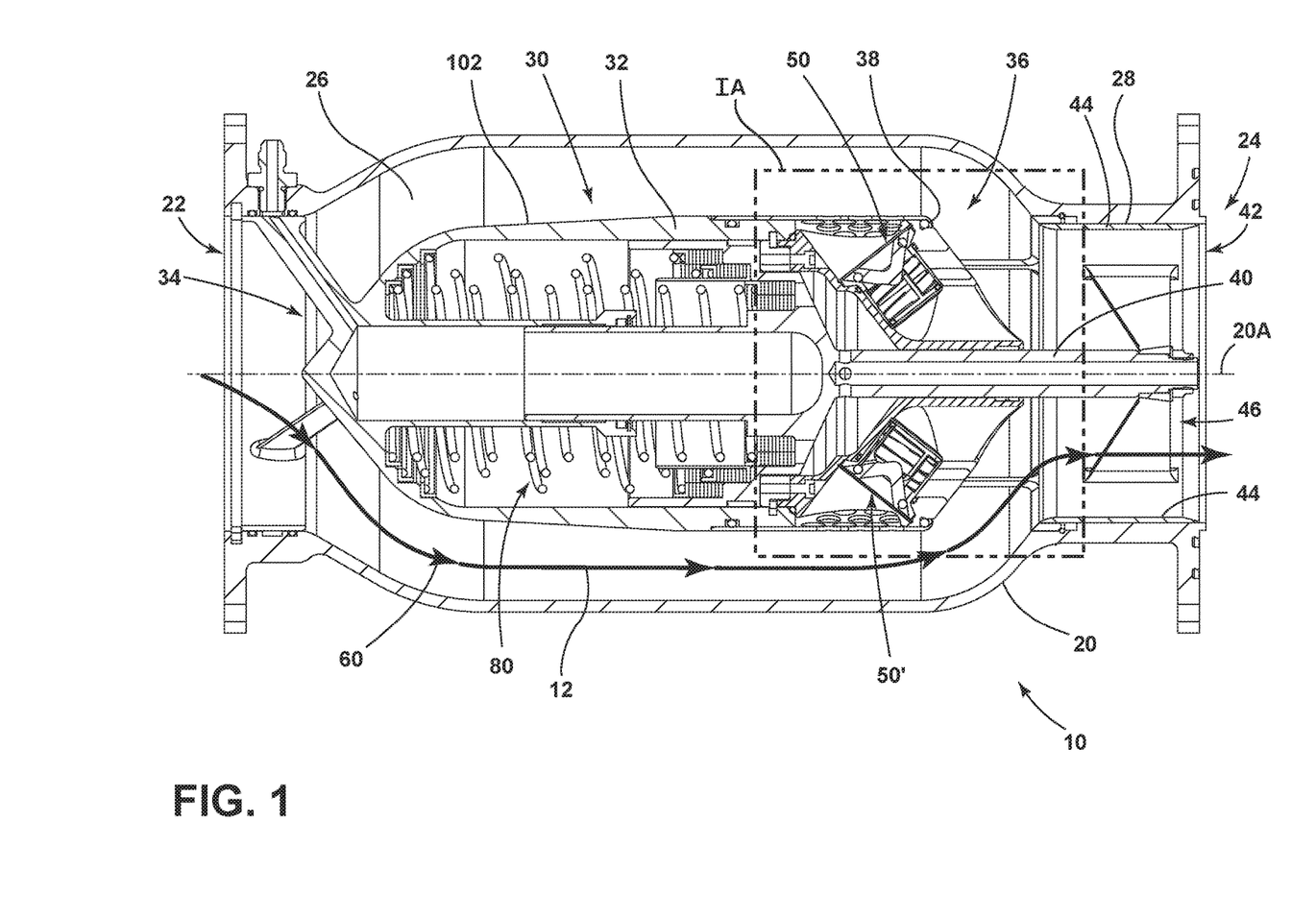
FIG. 1 is a cross-sectional view generally illustrating an embodiment of a fluid regulator system embodying aspects of the present disclosure, the regulator being shown in an open configuration, with fluid flowing from inlet to outlet.
Figure 1A:
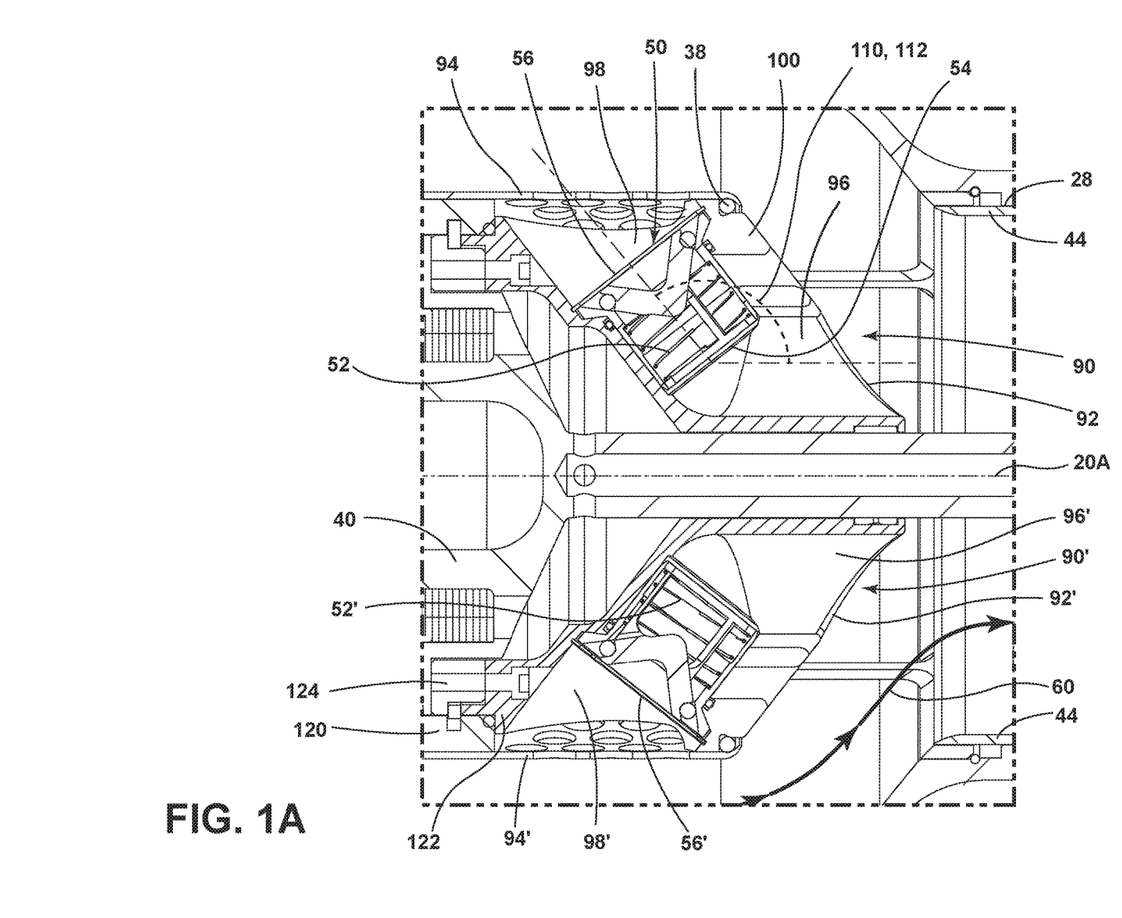
FIG. 1A is an enlarged view of FIG. 1.
Figure 2:
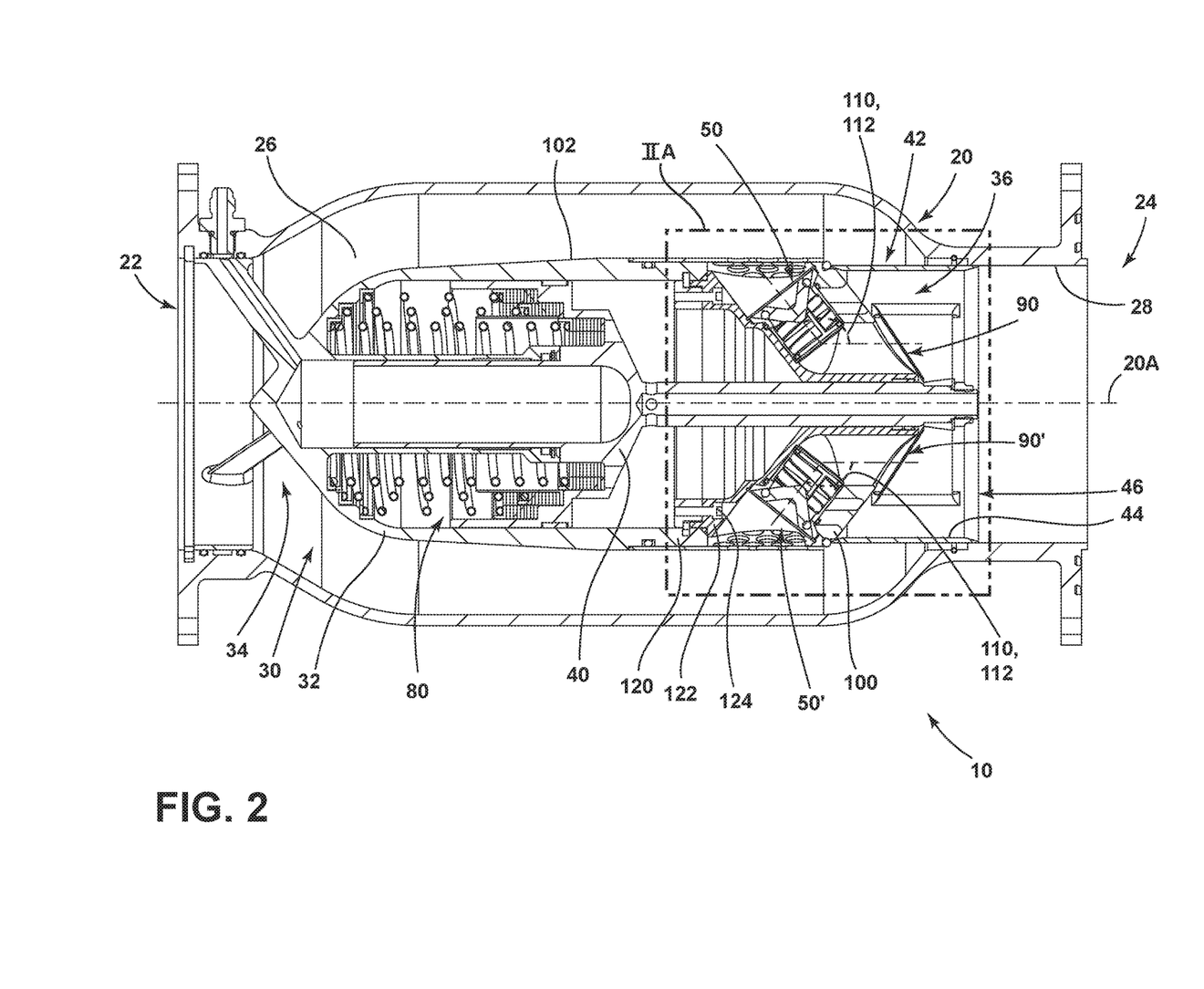
FIG. 2 is a cross-sectional view generally illustrating the embodiment of a fluid regulator system shown in FIG. 1, the regulator being shown in a closed configuration, with no fluid flowing between an inlet and an outlet.
Figure 2A:
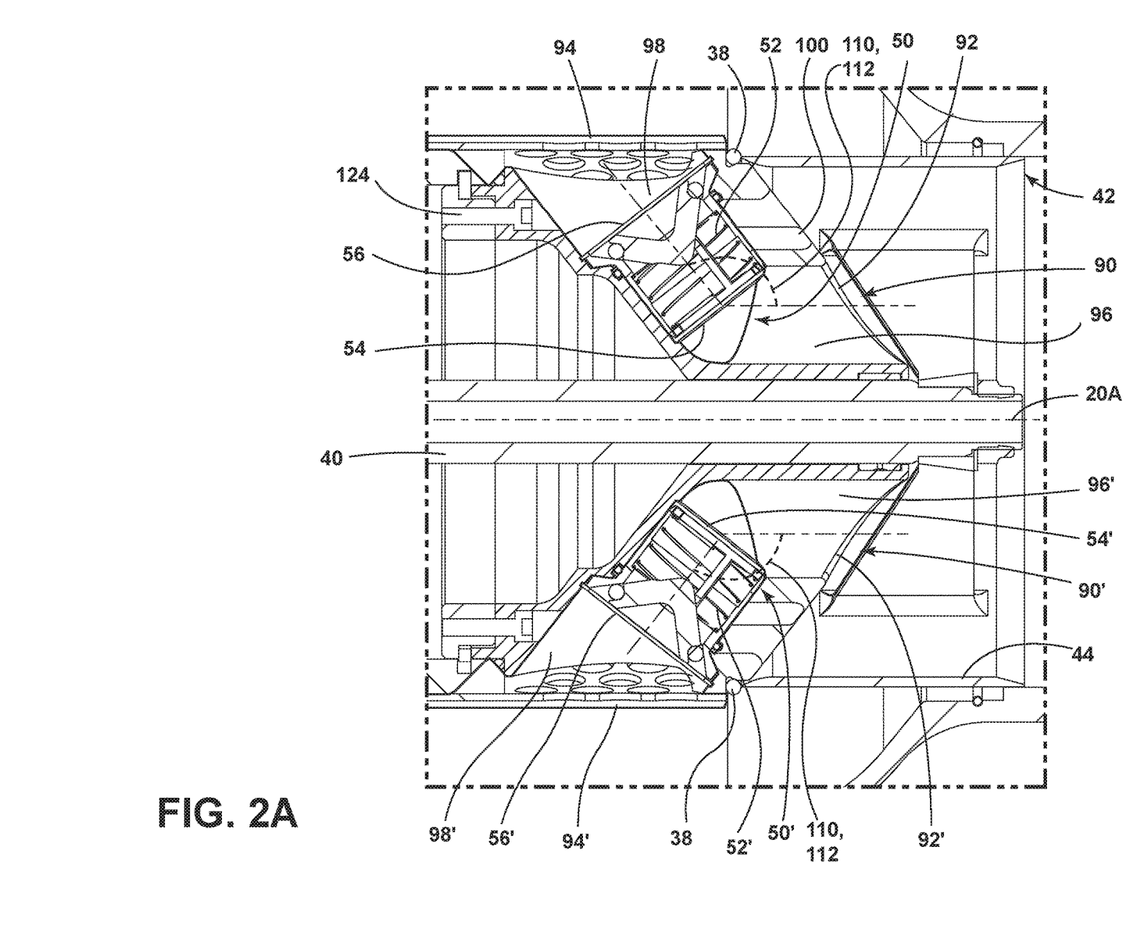
FIG. 2A is an enlarged view of FIG. 2.
Figure 3:
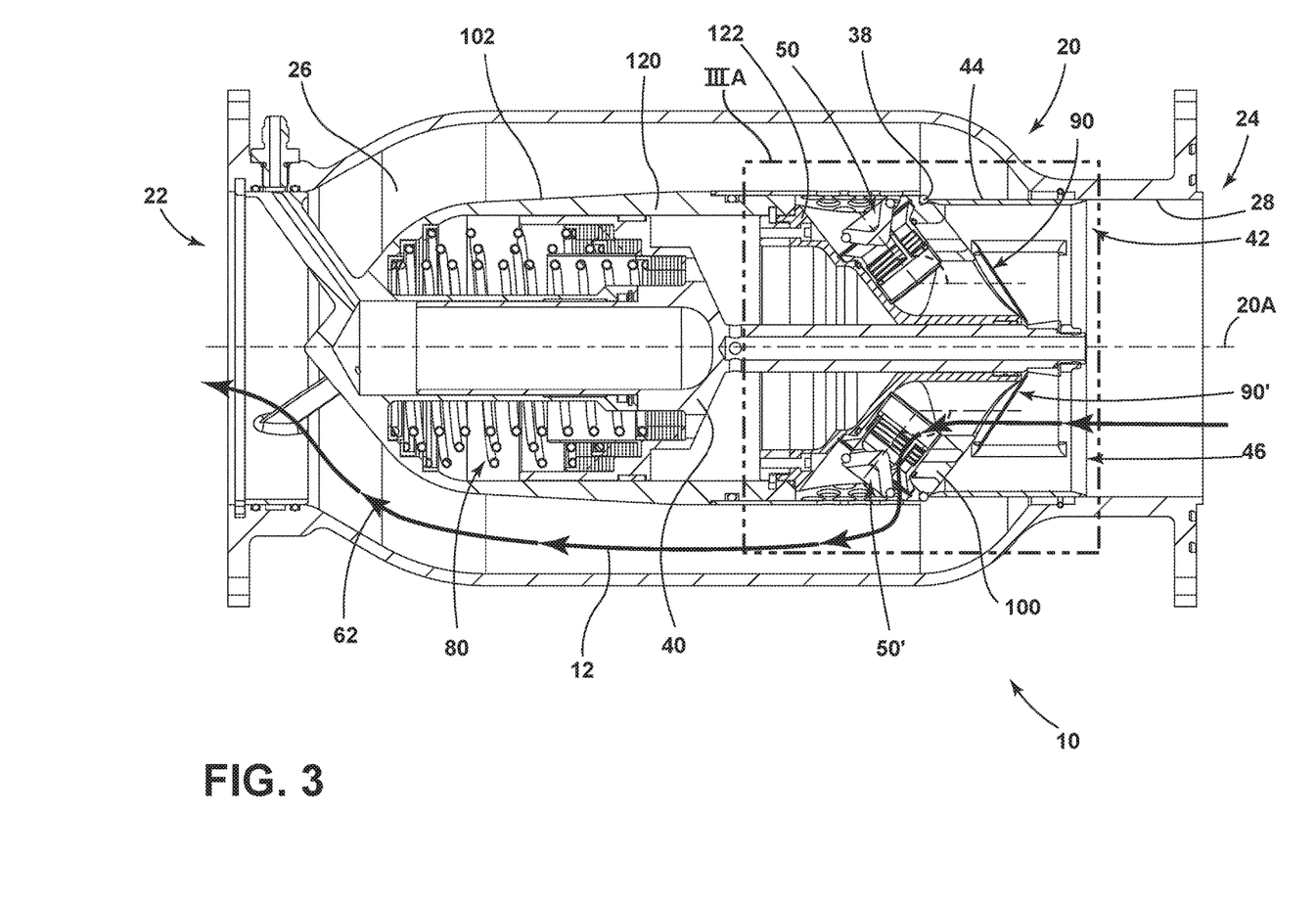
FIG. 3 is a cross-sectional view generally illustrating the embodiment of a fluid regulator system shown in FIGS. 1 and 2, the regulator being shown in a reverse flow configuration, with fluid flowing from an outlet to an inlet.
Figure 3A:
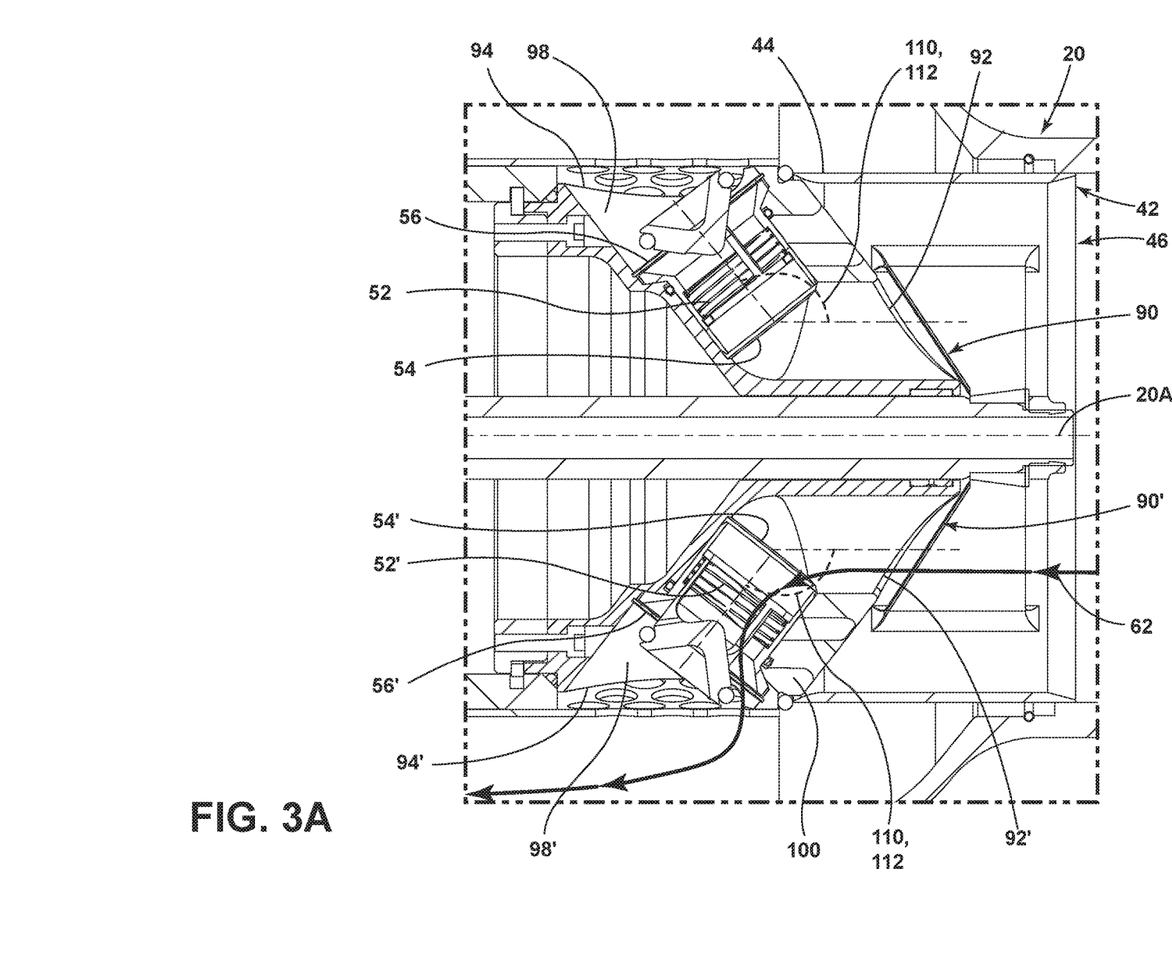
FIG. 3A is an enlarged view of FIG. 3.

In embodiments, if piston 40 is in a closed position and the outlet fluid pressure is above a certain value, the fluid pressure may overcome a biasing force of a check valve 50, 50' and/or a check valve 50, 50' may open, at least to some degree (see, e.g., FIGS. 3 and 3A). If a check valve 50, 50' is at least partially open, fluid 12 may flow through second fluid path 62, which may include flowing through aperture(s) 46 of piston 40, into a fluid passage 90, 90' of valve body 32, through a check valve 50, 50', into chamber 26, and/or to inlet 22, where fluid 12 may exit fluid regulator 10.

With embodiments, a fluid passage 90, 90' of valve body 32 may be disposed in valve body 32 and may include a passage inlet 92, 92' and a passage outlet 94, 94'. A passage inlet 92, 92' may be disposed at an end 36 of valve body 32 (e.g., an axial end). End 36 of valve body 32 may be disposed proximate housing outlet 24 and may include a tapered surface 100 that may include passage inlet 92, 92'. Passage outlet 94, 94' may be disposed at a radial side 102 of valve body 32. A fluid passage 90, 90' may include a first section 96, 96' that may be connected with inlet 92, 92'. First section 96, 96' may be substantially parallel with axis 20A. A fluid passage 90, 90' may include a second section 98, 98' that may be connected with passage outlet 94, 94' and/or first section 96, 96'. Second section 98, 98' may be disposed at an angle 110 relative to axis 20A (e.g., an obtuse angle). For example and without limitation, angle 110 may be about 100 degrees to about 150 degrees, about 120 degrees to about 130 degrees, and/or about 125 degrees relative to axis, but may be disposed at smaller or greater angles relative to axis 20A

In embodiments, a check valve 50, 50' may be disposed at an angle 112 with respect to axis 20A, such as an oblique and/or or obtuse angle. An inlet 54, 54' of check valve 50, 50' may be disposed closer to outlet 24 of housing 20 than an outlet 56, 56' of check valve 50, 50'. For example and without limitation, angle 112 may be about 100 degrees to about 150 degrees, about 120 degrees to about 130 degrees, and/or about 125 degrees relative to axis 20A, but may be disposed at smaller or greater angles relative to axis 20A. Second section angle 110 may be the same or about the same as check valve angle 112.

With embodiments, valve body 32 may include a first section 120 and a second section 122. Springs 80 may be disposed primarily in first section 120. A check valve 50, 50' may be disposed primarily and/or entirely in second section 122. First section 120 and second section 122 may be connected (e.g., fixed) together, such as via one or more fasteners 124.

In embodiments, fluid regulator may include a plurality of check valves (e.g., check valve 50 and check valve 50') that may be each be connected to and/or integrated with valve body 32. For example and without limitation, check valves 50, 50' may be disposed about axis 20A and/or may be circumferentially spaced from each other (e.g., equally). A plurality of check valves may include, for example only, at least two check valves, at least three check valves, at least four check valves, or more check valves. Each check valve 50, 50' may be connected to a respective fluid passage 90, 90' of valve body 32 or a plurality of check valves 50, 50' may be connected to (e.g., in fluid communication with) the same fluid passage 90, 90'.

It should be understood that references herein to springs (e.g., spring 52, 52', 80) are not limited to a particular type of spring and may include, for example, one or more of a variety of components configured to provide a biasing force.

Various embodiments are described herein for various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Reference throughout the specification to "various embodiments," "with embodiments," "in embodiments," or "an embodiment," or the like, means that a particular feature, structure, or characteristic described in connection with the embodiment is included in at least one embodiment. Thus, appearances of the phrases "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features, structures, or characteristics of one or more other embodiments without limitation given that such combination is not illogical or non-functional.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." throughout the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are intended to be inclusive unless such a construction would be illogical.

It is intended that all matter contained in the above description or shown in the accompanying drawings shall be interpreted as illustrative only and not limiting. Changes in detail or structure may be made without departing from the present disclosure.

Furthermore, the mixing and matching of features, elements and/or functions between various examples is expressly contemplated herein so that one of ordinary skill in the art would appreciate from this disclosure that features, elements, and/or functions of one example may be incorporated into another example as appropriate, unless described otherwise, above. Moreover, many modifications may be made to adapt a particular situation or material to the teachings of the present disclosure without departing from the scope thereof. Therefore, it is intended that the present teachings not be limited to the particular examples illustrated by the drawings and described in the specification, but that the scope of the present disclosure will include any embodiments falling within the foregoing description and the appended claims.

What is claimed:

1. A fluid pressure regulator comprising:
a housing including an inlet and an outlet;
a valve assembly disposed in the housing; and
one or more check valves disposed within the housing;
wherein the one or more check valves are closed when a regulator inlet pressure is greater than a regulator output pressure; and when the regulator output pressure is greater than the regulator inlet pressure, the one or more check valves open and flow occurs from the outlet of the housing to the inlet of the housing, even if the valve assembly is in a closed position; and the housing includes a first flow path that extends from the inlet, around a valve body of the valve assembly, through a piston of the valve assembly, and to the outlet; and the housing includes a second flow path that extends from the outlet, through the piston, into a fluid chamber of the housing, into a fluid passage of the valve body of the valve assembly, through the one or more check valves, into the fluid chamber, and to the inlet.

2. The fluid pressure regulator of claim 1, wherein the one or more check valves are disposed at least partially in the valve body of the valve assembly.

3. The fluid pressure regulator of claim 1, wherein the valve body has one or more internal fluid passages.

4. The fluid pressure regulator of claim 3, wherein the one or more check valves are disposed at least partially within the one or more internal fluid passages.

5. The fluid pressure regulator of claim 3, wherein each internal fluid passage includes a first section disposed substantially in parallel with a longitudinal axis of the housing and a second section disposed at an obtuse angle relative to the longitudinal axis.

6. The fluid pressure regulator of claim 3, wherein each of the one or more internal fluid passages includes a passage inlet disposed at an axial end of the valve body of the valve assembly and a passage outlet disposed at a radial side of the valve body.

7. The fluid pressure regulator of claim 1, wherein the one or more check valves are disposed at an obtuse angle relative to a longitudinal axis of the housing.

8. The fluid pressure regulator of claim 7, wherein the obtuse angle is about 120 degrees to about 130 degrees.

9. The fluid pressure regulator of claim 1, wherein the valve assembly controls fluid flow via the first flow path and the one or more check valves control fluid flow via the second flow path independently of the valve assembly.

10. The fluid pressure regulator of claim 1, wherein the one or more check valves includes at least two check valves and the valve body of the valve assembly includes a fluid passage for each of the at least two check valves.

11. The fluid pressure regulator of claim 1, wherein the one or more check valves includes at least four check valves and the valve body of the valve assembly includes a fluid passage for each of the at least four check valves.

12. The fluid pressure regulator of claim 1,
wherein the one or more check valves provide a fluid flow path between the outlet and the inlet if an outlet pressure is above a threshold value, even if the valve assembly is in a closed position.

13. A fluid pressure regulator comprising:
a housing including an inlet and an outlet;
a valve assembly disposed in the housing; and
one or more check valves disposed within the housing;
wherein the one or more check valves are closed when a regulator inlet pressure is greater than a regulator output pressure; when the regulator output pressure is greater than the regulator inlet pressure, the one or more check valves open and flow occurs from the outlet of the housing to the inlet of the housing, even if the valve assembly is in a closed position; and
wherein the valve assembly includes a valve body and a piston having a cylindrical portion; and an outer wall of the cylindrical portion is configured to provide a fluid seal between the housing and the valve assembly in a closed position of the piston and to allow fluid to flow between the housing and the valve assembly in an open position of the piston.

14. The fluid pressure regulator of claim 13, wherein the valve body includes a first section fixed to a second section and the one or more check valves are disposed in one or more respective fluid passages of the second section.

15. The fluid pressure regulator of claim 14, wherein the one or more respective fluid passages each include a section disposed in parallel with a longitudinal axis of the housing.

16. The fluid pressure regulator of claim 13, wherein the cylindrical portion includes one or more axially-extending apertures configured to permit fluid to flow through the piston.

17. The fluid pressure regulator of claim 13, wherein the cylindrical portion is engaged with the housing in the open position and is engage with the housing and a valve seat of the valve assembly in the closed position.

18. The fluid pressure regulator of claim 13, wherein in the open position the cylindrical portion is disposed at the outlet of the housing.

19. The fluid pressure regulator of claim 13, wherein the one or more check valves provide a fluid flow path between the outlet and the inlet if an outlet pressure is above a threshold value, even if the valve assembly is in the closed position.

* * * * *